(No Model.)

S. GISSINGER.
HORSE COLLAR.

No. 276,577. Patented May 1, 1883.

WITNESSES
Fred. G. Dieterich
F. C. Dieterich

INVENTOR
Samuel Gissinger
By J. J. Johnston Attorney

UNITED STATES PATENT OFFICE.

SAMUEL GISSINGER, OF PITTSBURG, PENNSYLVANIA.

HORSE-COLLAR.

SPECIFICATION forming part of Letters Patent No. 276,577, dated May 1, 1883.

Application filed January 30, 1882. (No model.)

*To all whom it may concern:*

Be it known that I, SAMUEL GISSINGER, of Pittsburg, (but formerly of Lawrenceville,) in the county of Allegheny and State of Pennsylvania, have invented a new and useful Improvement in Horse-Collars; and I do hereby declare that the following is a full, clear, and exact description thereof, reference being had to the accompanying drawings, and to the letters of reference marked thereon.

My invention relates to an improvement in horse-collars; and it consists in providing them with hollow elastic pads for holding air or water. Said pads, each having a charging-tube, are adapted to press against that portion of the horse's shoulder upon which comes the greatest and most chafing strain, and which will, when the horse is at rest, throw the collar forward from the shoulders and allow a free circulation of air between the collar, shoulders, neck, and breast of the horse, as will hereinafter more fully and at large appear.

To enable others skilled in the art with which my invention is most nearly connected to make and use it, I will proceed to describe its construction and operation.

Figure 1:
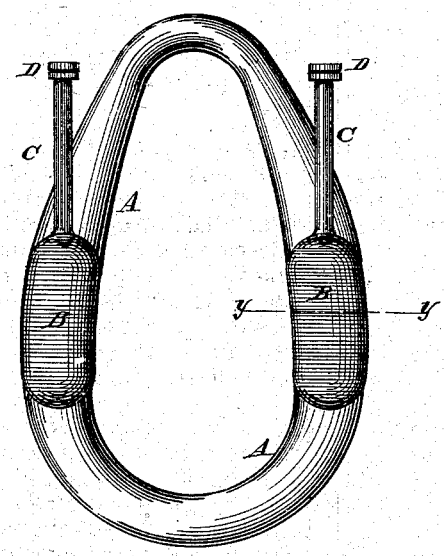
Figure 2:
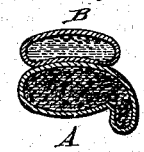
Figure 3:
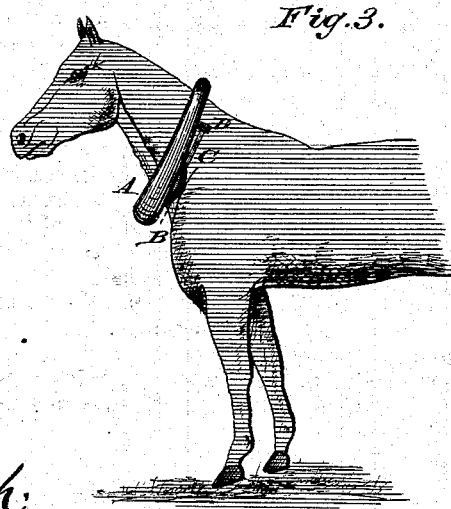

In the accompanying drawings, which form part of my specification, Figure 1 is a face view of an ordinary horse-collar provided with my improvement. Fig. 2 is a transverse section of the same at line *y y* of Fig. 1. Fig. 3 represents the relation of the collar to the shoulder of the horse.

Reference being had to the accompanying drawings, A represents a horse-collar of the ordinary construction, provided with my improved elastic hollow pad B for holding air, water, or other liquid. The pad B may be constructed of india-rubber or other elastic material that is impervious to air or water. Said pad or pads is provided with a charging-tube, C, constructed of the same material as that used in the construction of the pad. On the upper end of said tube is secured metallic screw-cap D, which may be of any desired construction, and secured to the charging-tube by any suitable means. The pad B is secured to the face of the collar, in the position represented in Figs. 1 and 3, by the sewing or riveting process, or by any other suitable means. The mode of attachment I leave to those skilled in the art.

Wagoners and others who employ draft-horses have observed the necessity of having the collar so constructed that it will yield and conform to the shoulder of the horse at the point where the greatest chafing and strain occur, and notwithstanding that every precaution is taken for the purpose of having the collar yield and conform to the shoulders of the horse, the chafing of the collar upon the shoulders of the horse, particularly when hauling heavy loads, frequently causes raw and sore shoulders, which will be obviated by the employment of my hollow elastic pad filled with air, water, or other liquid.

Another advantage growing out of my improvement in pads is that in starting the team or horse the strain will gradually come upon the shoulders of the horse or horses.

Having thus described my improvement, what I claim is—

The herein-described horse-collar, having elastic pads B B arranged on the inner side thereof, and provided with elastic charging-tubes C, having inclosing screw-caps D, as and for the purpose specified.

SAMUEL GISSINGER.

Witnesses:
A. S. H. JOHNSTON,
W. S. COLWELL.